R. B. SMITH.
EGG-HOLDER.

No. 187,186.  Patented Feb. 6, 1877.

WITNESSES
Villette Anderson,
W. Cellasi

INVENTOR
Richard B. Smith,
by E. W. Anderson.
ATTORNEY.

UNITED STATES PATENT OFFICE.

RICHARD B. SMITH, OF CENTREDALE, IOWA.

IMPROVEMENT IN EGG-HOLDERS.

Specification forming part of Letters Patent No. 187,186, dated February 6, 1877; application filed January 20, 1877.

*To all whom it may concern:*

Be it known that I, RICHARD B. SMITH, of Centredale, in the county of Cedar and State of Iowa, have invented a new and valuable Improvement in Egg-Holder; and I do hereby declare that the following is a full, clear, and exact description of the construction and operation of the same, reference being had to the annexed drawings, making a part of this specification, and to the letters and figures of reference marked thereon.

Figure 1:
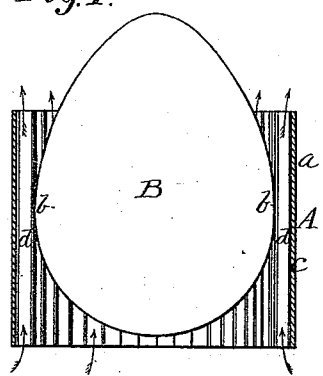
Figure 2:
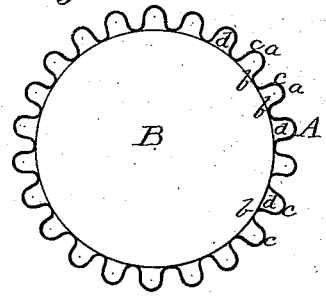
Figure 3:
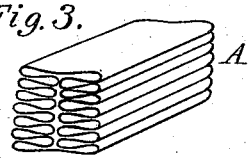

Figure 1 of the drawings is a representation of a vertical section of the egg-holder, showing the position of the egg. Fig. 2 is a plan view of the same. Fig. 3 is a view of a holder folded for packing.

This invention has for its object to provide means for holding hot eggs in the shell; and it consists in the construction and novel arrangement of a vertically fluted or corrugated cylinder of paper or other flexible material, open at both ends, and having sufficient diameter to receive the egg within it, as hereinafter shown and described.

In the accompanying drawings, the letter A designates the holder, and B the egg in position within the same.

The holder is made of paper, thin cardboard, or other flexible material, and is fluted or corrugated vertically or in the direction of the length of the cylinder, as indicated at $a$, entirely around the holder. This may be accomplished by passing the paper or other material between fluting-rollers, or in any other convenient manner.

In the formation of these corrugations the inside ribs $b$ are designed to bear against the shell of the egg when placed within the holder, and the exterior ribs $c$ form bearings for the fingers in clasping the same. Within the holder, and between the same and the wall of the egg, the channels $d$ of the corrugations form flues, through which the cold air from below ascends in currents as that above is heated by the egg, and thereby the temperature of the holder is kept sufficiently below that of the egg to enable it to be readily handled.

In the use of this device it is not necessary to touch the egg. The cylinder is slipped over either end of the egg, and as it is open at both ends the entire shell can be easily reached for removal. Or, if it is to be eaten in the shell, the proper end of the egg is brought uppermost by turning the holder. As the ends of this holder are level margins, it can be used as a stand or support for the egg upon occasion.

These articles are designed to be of very little cost, so that they may be thrown away after use. In order that they may be compactly stored in boxes for transportation, they are designed to be folded as indicated in Fig. 3 of the drawings or otherwise.

In hotels and public restaurants they will serve for a convenient advertising medium.

Having described this invention, what I claim as new, and desire to secure by Letters Patent, is—

The flexible egg-holding cylinder herein described, open at both ends, and having its entire wall fluted or corrugated in the direction of its length, to form bearings $b$ and $c$ for the egg and fingers, respectively, and draft-flues $d$ between the egg-wall and the holder, substantially as specified.

In testimony that I claim the above I have hereunto subscribed my name in the presence of two witnesses.

R. B. SMITH.

Witnesses:
GEO. E. BEAN,
E. GRINNELL.